(12) United States Patent
Lazic et al.

(10) Patent No.: US 9,199,649 B2
(45) Date of Patent: Dec. 1, 2015

(54) ARRANGEMENT AND METHOD FOR SAFEGUARDING DRIVER ATTENTIVENESS

(71) Applicant: VOLVO CAR CORPORATION, Goeteborg (SE)

(72) Inventors: Nenad Lazic, Goeteborg (SE); Claes Olsson, Moelnlycke (SE)

(73) Assignee: Volvo Car Corporation, Gothenburg (SE)

(*) Notice: Subject to any disclaimer, the term of this patent is extended or adjusted under 35 U.S.C. 154(b) by 195 days.

(21) Appl. No.: 13/666,103

(22) Filed: Nov. 1, 2012

(65) Prior Publication Data

US 2013/0124046 A1    May 16, 2013

(30) Foreign Application Priority Data

Nov. 11, 2011 (EP) .................................... 11188766

(51) Int. Cl.
| | |
|---|---|
| *B60W 40/09* | (2012.01) |
| *B60W 50/14* | (2012.01) |
| *B60W 30/12* | (2006.01) |
| *B60K 28/06* | (2006.01) |
| *B62D 15/02* | (2006.01) |

(52) U.S. Cl.
CPC ............. *B60W 40/09* (2013.01); *B60K 28/066* (2013.01); *B60W 30/12* (2013.01); *B60W 50/14* (2013.01); *B62D 15/025* (2013.01)

(58) Field of Classification Search
None
See application file for complete search history.

(56) References Cited

U.S. PATENT DOCUMENTS 7,265,510 B2 *  9/2007  Braeuchle et al. ............ 318/580
7,912,665 B2 *  3/2011  Deng et al. .................... 702/109
8,095,271 B2 *  1/2012  Lee ................................. 701/41
8,170,751 B2 *  5/2012  Lee et al. ........................ 701/42
8,849,517 B2 *  9/2014  Kluge ............................. 701/43
2005/0103561 A1 *  5/2005  Endo et al. .................... 180/443
2008/0249685 A1 * 10/2008  Hara et al. ...................... 701/42
2008/0255727 A1 * 10/2008  Lee ................................. 701/41

(Continued)

FOREIGN PATENT DOCUMENTS

| DE | 102007039332 | 2/2008 |
| DE | 102009028647 | 2/2011 |

(Continued)

OTHER PUBLICATIONS

European Search Report for Application No. 11188766.7 dated Apr. 26, 2012.

(Continued)

*Primary Examiner* — Yonel Beaulieu
*Assistant Examiner* — Krishnan Ramesh
(74) *Attorney, Agent, or Firm* — Brooks Kushman P.C.

(57) ABSTRACT

An arrangement and a method are described for safeguarding driver attentiveness to the task of steering while operating a vehicle having a lane keeping aid system. The arrangement and method provide for measuring a pinion angle and a torsion bar torque when the lane keeping aid system is applying an overlaying steering torque. Driver applied torque is estimated from the measurements. A hands-off metric is calculated based on a relation between the measurements and the estimate. Hands-off is determined based on a comparison of the metric with a predefined threshold. The arrangement and method further provide for evaluating hands-on between torque interventions by the lane keeping aid system. An action is determined based on the determined hands-off and the evaluated hands-on and the action determined performed.

20 Claims, 1 Drawing Sheet

(56) References Cited

U.S. PATENT DOCUMENTS

| | | | |
|---|---|---|---|
| 2010/0152952 A1* | 6/2010 | Lee et al. | 701/29 |
| 2010/0222976 A1* | 9/2010 | Haug | 701/70 |
| 2010/0228417 A1* | 9/2010 | Lee et al. | 701/23 |
| 2011/0098890 A1* | 4/2011 | Lee et al. | 701/42 |
| 2011/0112724 A1* | 5/2011 | Kariatsumari et al. | 701/41 |
| 2011/0246028 A1* | 10/2011 | Lisseman et al. | 701/45 |
| 2012/0041645 A1* | 2/2012 | Benyo et al. | 701/42 |
| 2012/0191266 A1* | 7/2012 | Kluge | 701/1 |
| 2013/0158771 A1* | 6/2013 | Kaufmann | 701/23 |
| 2013/0190988 A1* | 7/2013 | Limpibunterng et al. | 701/42 |

FOREIGN PATENT DOCUMENTS

| | | |
|---|---|---|
| EP | 1645454 | 12/2006 |
| EP | 2177422 | 4/2010 |
| JP | 2009280077 | 12/2009 |

OTHER PUBLICATIONS

Communication from the European Patent Office regarding European Applicaton No. 11188766.7, Dated Jan. 7, 2014, All together 24 Pages.

* cited by examiner

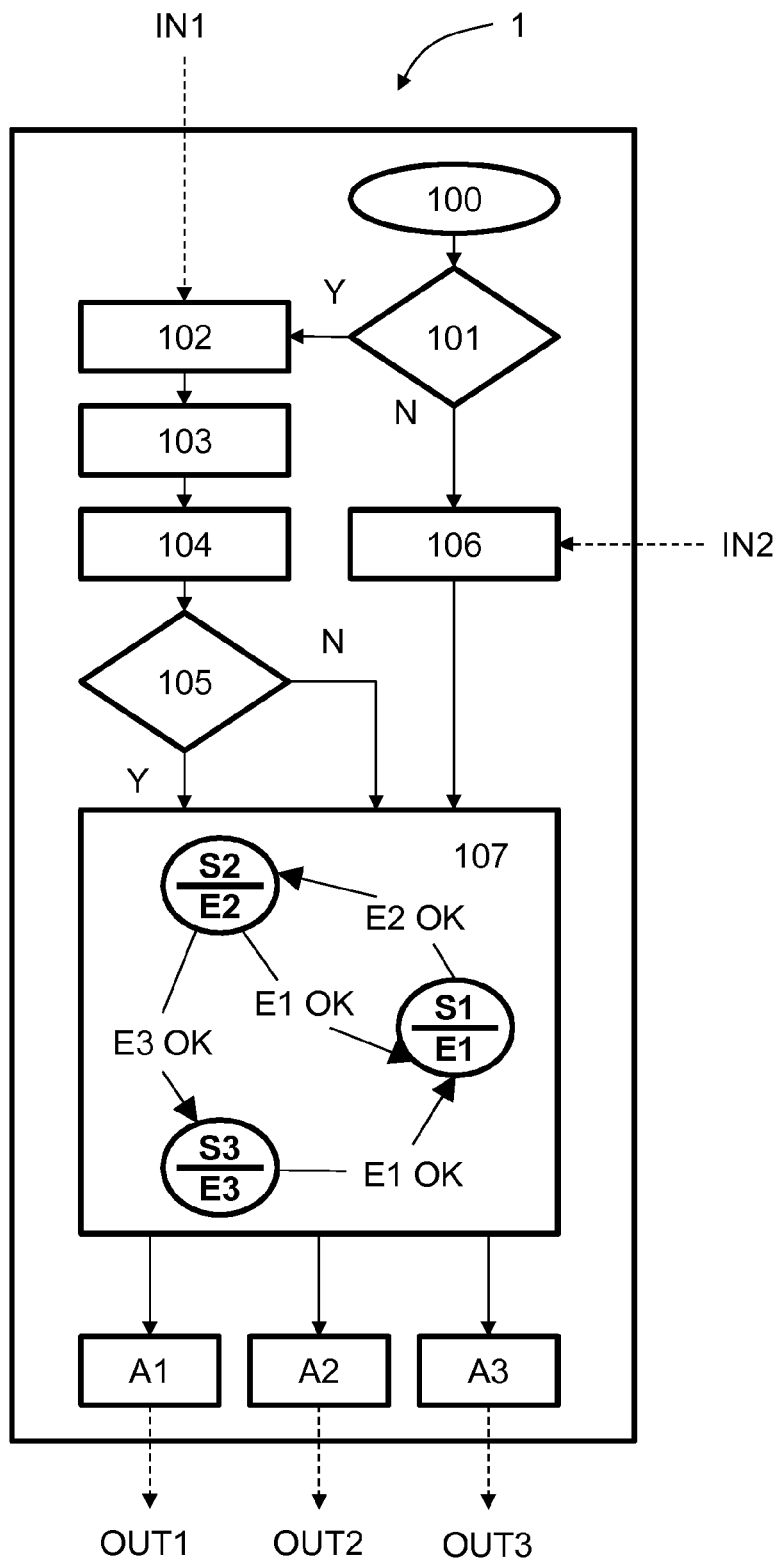

ARRANGEMENT AND METHOD FOR SAFEGUARDING DRIVER ATTENTIVENESS

CROSS-REFERENCE TO RELATED APPLICATIONS

This application claims foreign priority benefits under 35 U.S.C. §119(a)-(d) to European patent application number EP 11188766.7, filed Nov. 11, 2011, which is incorporated herein by reference in its entirety.

TECHNICAL FIELD

Embodiments herein relate to an arrangement for safeguarding driver attentiveness to the task of steering while operating a vehicle having a lane keeping aid system for selectively applying an overlaying steering torque to the steering system. In particular they relate to an arrangement for safeguarding driver attentiveness to the task of steering while operating a vehicle having a lane keeping aid system for selectively applying an overlaying steering torque to the steering system, the steering system comprising a steering wheel, a pinion and a torsion bar.

Embodiments herein further relate to a method for safeguarding driver attentiveness to the task of steering while operating a vehicle having a lane keeping aid system for selectively applying an overlaying steering torque to the steering system. In particular they relate to a method for safeguarding driver attentiveness to the task of steering while operating a vehicle having a lane keeping aid system for selectively applying an overlaying steering torque to the steering system, the steering system comprising a steering wheel, a pinion and a torsion bar.

BACKGROUND

Operation of modern vehicles is becoming more and more autonomous, i.e., vehicles are becoming more and more able to provide driving control with less driver intervention.

An example of such a system is a so called lane keeping aid system, which aids the driver by reducing the driving burden through attempting to maintain the vehicle near the center of a lane on the road. Such a lane keeping aid system normally applies an overlaying steering torque to the steering system of the vehicle with the objective to prevent unintentional lane change.

It may be possible for a driver to abuse such a lane keeping aid system to stay in lane without touching the steering wheel, i.e. misusing the lane keeping aid system as an autopilot.

A vehicle equipped with such a lane keeping aid system will typically be able to stay in lane for an extended period of time, depending on e.g. road geometry. The vehicle will, however, possibly bounce against lane markings, either repeatedly against lane markings at one side or between left and right hand side lane markings. Although this driving behavior does not necessarily imply an immediate risk, it is likely to lead to an unsuitable vehicle trajectory which stands out as confusing for surrounding vehicles. Potentially, if the lane keeping aid system eventually fails to prevent a lane change, e.g. due to loss of tracking of lane markings, the vehicle might enter an adjacent lane while the driver does not keep his/her hands on the steering wheel causing an undesirable situation.

Thus, it is typically not desirable to reduce the driver's vigilance and attentiveness, even when such systems are providing some or most of the control of the vehicle. It is generally imperative that the driver maintains his/her hands on the steering wheel, and is ready to take over the steering control whenever the situation demands.

Consequently, existing systems of this kind usually comprises functionality for determining if the hands of the driver are on the steering wheel. One such system is previously known through US20100228417, which relates to a system and method for determining whether a vehicle driver is holding a steering wheel of the vehicle while the vehicle is in an autonomous driving mode. The autonomous driving mode may be provided by a system for attempting to maintain the vehicle near the center of a lane on the road.

The vehicle of US20100228417 includes an electric power steering (EPS) system and may include an active front steering (AFS) system, both of which include a motor that can apply a high frequency and low amplitude perturbation signal to the steering wheel of the vehicle. Such a high frequency and low amplitude perturbation signal is not felt by the vehicle driver and does not cause the vehicle to turn, but is able to be detected by a steering angle sensor.

The method proposed by US20100228417 subtracts a steering angle command signal from the steering angle signal and removes road disturbances, and then determines whether the induced perturbation signal is present in the steering angle sensor signal. If the perturbation signal is present, then the system knows that the vehicle driver is not holding the steering wheel.

The system proposed by US20100228417 may cause a warning signal to be issued or provide some type of audible or visual indication that the vehicle driver is not holding onto the steering wheel. The detection is only activated when the vehicle is in the autonomous or semi-autonomous driving mode. Activation thereof is performed through a switch, which will be closed when the system is in the autonomous or semi-autonomous mode.

SUMMARY

Embodiments herein aim to provide an improved arrangement for safeguarding driver attentiveness to the task of steering while operating a vehicle having a lane keeping aid system for selectively applying an overlaying steering torque to the steering system, the steering system comprising a steering wheel, a pinion and a torsion bar.

This is provided by an arrangement which comprises: means for measuring pinion angle and torsion bar torque when the lane keeping aid system is applying an overlaying steering torque; means for estimating driver applied torque from the measured pinion angle and torsion bar torque; means for calculating a hands-off metric based on a relation between the measured torsion bar torque and the estimated driver applied torque; means for determining hands-off based on a comparison of the calculated hands-off metric with a predefined threshold; means for evaluating hands-on between torque interventions by the lane keeping aid system; means for determining an action based on the determined hands-off and the evaluated hands-on; and means for performing the action determined.

Due to the determination of whether a driver of a vehicle is holding on to a steering wheel of the vehicle or not is carried out only during periods of ongoing interventions by the lane keeping system, i.e. whenever there is a torque overlay from the lane keeping aid system, the detection becomes more reliable/precise due to the fact that guaranteed levels of excitation of the steering system are provided during ongoing interventions as any suitable detection algorithm will normally require sufficient excitation. Furthermore, determination only during periods of ongoing interventions by the lane keeping system generates a logic link to the system causing the need for the detection, why, from a driver perspective, it will be easy to understand the information about hands-off and the information could be kept at a minimum. Still further, the risk for false, and thus annoying, hands-off warnings is practically eliminated, as compared to systems with an evaluation at all times, as a sensitive hands-off detection may be used. Moreover, the hands-off detection performed only during ongoing interventions by the lane keeping system enables use of a very conservative hands-on evaluation rendering unattended steering virtually impossible.

According to an embodiment, the means for calculating a hands-off metric further are arranged to recalculate the hands-off metric after a predefined time period.

Recalculation of the hands-off metric after a predefined time period makes it possible to select, as a tuning parameter, an appropriate sampling interval for establishing if the driver is holding on to the steering wheel or not.

According to an embodiment, the arrangement further comprises means for terminating the predefined time period once the means for determining hands-off has performed the determination.

Terminating the predefined time period enables a high sampling frequency which provides for improved sensibility of the arrangement.

According to an embodiment, the means for determining an action are arranged for determining whether to allow further torque interventions by the lane keeping aid system or to provide a hands-off warning to the driver of the vehicle or to disable or re-enable the lane keeping aid system based on predefined conditions.

Determination of a suitable action based on predefined conditions makes it possible to finely tune this determination in several ways depending on the desired machine-human interaction of the hands-on/off detection. Variations could e.g. concern when to provide a warning to the driver and when to disable or when to re-enable the lane keeping aid system.

According to an embodiment, the means for determining an action comprises a state machine arranged for determining based on the predefined conditions whether to allow further torque interventions by the lane keeping aid system or to provide a hands-off warning to the driver of the vehicle or to disable or re-enable the lane keeping aid system.

Use of a state machine for performing the determination of an action makes it possible to refine the fine tuning of the determination.

Further embodiments herein aim to provide an improved method for safeguarding driver attentiveness to the task of steering while operating a vehicle having a lane keeping aid system for selectively applying an overlaying steering torque to the steering system, the steering system comprising a steering wheel, a pinion and a torsion bar.

Embodiments of the method provide similar features as described above for corresponding embodiments of the arrangement.

BRIEF DESCRIPTION OF THE DRAWINGS

In the following, embodiments herein will be described in greater detail by way of example only with reference to attached drawings, in which FIG. 1 is a schematic diagram of the arrangement/method and state machine described herein.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein; however, it is to be understood that the disclosed embodiments are merely exemplary of the various embodiments and alternative forms. The FIGURE are not necessarily to scale; some features may be exaggerated or minimized to show details of particular components. Therefore, specific structural and functional details disclosed herein are not to be interpreted as limiting, but merely as a representative basis for teaching one skilled in the art.

In overview, embodiments herein, as will be described with reference to FIG. 1, relate to an arrangement 1 for safeguarding driver attentiveness to the task of steering while operating a vehicle having a lane keeping aid system. The lane keeping aid system is provided for, when activated, selectively apply an overlaying steering torque to the steering system with the objective to prevent unintentional lane changes. Activation of the lane keeping aid system may be performed by the driver of the vehicle using e.g. a simple on/off switch. The steering system of the vehicle comprises, among other components not mentioned herein, a steering wheel, a pinion and a torsion bar.

The arrangement 1 comprises means 102, IN1 for measuring pinion angle and torsion bar torque when the lane keeping aid system is applying an overlaying steering torque. These measuring means 102, IN1 may comprise sensors IN1 for providing information regarding current pinion angle as well as current torsion bar torque. The measuring means 102, IN1 may further comprise processing means 102 for processing the acquired sensor data into formats suitable for further processing.

The arrangement 1 further comprises means 103 for estimating driver applied torque from the measured pinion angle and torsion bar torque. These estimating means 103 may be arranged to perform this estimation using the above mentioned processed sensor data.

The arrangement 1 further comprises means 104 for calculating a hands-off metric based on a relation between the measured torsion bar torque and the estimated driver applied torque, and means 105 for determining hands-off based on a comparison of the calculated hands-off metric with a predefined threshold.

In one embodiment the means 104 for calculating a hands-off metric further are arranged to recalculate the hands-off metric after a predefined time period, so that the hands-off metric can be determined multiple times during the same torque intervention. Through being able to select different predetermined time periods it becomes possible to tune an appropriate sampling interval for establishing if the driver is holding on to the steering wheel or not.

In a further embodiment the arrangement comprises means for terminating the predefined time period once the means 105 for determining hands-off has performed the determination. Hereby the predefined time period may be shortened to enable a high sampling frequency which provides for improved sensibility of the arrangement.

The arrangement 1 still further comprises means 106, IN2 for evaluating hands-on between torque interventions by the lane keeping aid system. These evaluating means 106, IN2 are arranged to evaluate whether the driver is sufficiently performing the task of steering the vehicle. As an input IN2 for this determination may be used any suitable data indicative of driver steering activity and will therefore not be further described herein. The evaluation is only performed between torque interventions by the lane keeping aid system, which is indicated by torque intervention determining means 101. As hands-off determination is only carried out during torque interventions by the lane keeping aid system, a sensitive hands-on detection may be used, whereby abuse of the lane keeping aid system may be prevented.

The arrangement yet further comprises means 107 for determining an action based on the determined hands-off and the evaluated hands-on.

In further embodiments these means 107 for determining an action are arranged for determining whether to allow further torque interventions by the lane keeping aid system or to provide a hands-off warning to the driver of the vehicle or to disable or re-enable the lane keeping aid system based on predefined conditions E1, E2, E3.

In a still further embodiment these means 107 for determining an action comprises a state machine S1, S2, S3 arranged for determining based on the predefined conditions E1, E2, E3, whether to allow further torque interventions by the lane keeping aid system or to provide a hands-off warning to the driver of the vehicle or to disable or re-enable the lane keeping aid system.

The predefined conditions E1, E2, E3, may be seen as entry conditions for switching to a state associated with an action. The entry condition E1 may e.g. be that the driver has been found to sufficiently perform the task of steering the vehicle by the evaluating means 106, IN2. If the entry condition E1 is fulfilled the system will switch to state S1, which in this case would be a state associated with the action of re-enabling the lane keeping aid system.

The entry condition E2 may e.g. be that the determining means 105 has determined hands-off during a predetermined number of subsequent torque interventions by the lane keeping aid system. It is noted that the term subsequent torque interventions is not limited to torque interventions that follows immediately after each other. Thus, the entry condition E2 may be fulfilled also by a predetermined number of subsequent torque interventions that do not follow immediately after each other, as long as hands-on is not detected in-between the subsequent torque interventions. If the entry condition E2 is fulfilled the system will switch to state S2, which in this case would be a state associated with the action of providing a hands-off warning to the driver of the vehicle. The predetermined number may be set to e.g. allow up to three torque interventions by the lane keeping aid system without an indication that the driver is attending to the task of steering before providing a warning. The number of subsequent torque interventions allowed without the driver having his/her hands-on the steering wheel may be registered by a counter and the number allowed before providing a warning may be tuned through changing a warning threshold value corresponding thereto.

The entry condition E3 may e.g. be that the determining means 105 has determined hands-off during a higher predetermined number of subsequent torque interventions by the lane keeping aid system. If the entry condition E3 is fulfilled the system will switch to state S3, which in this case would be a state associated with the action of disabling the lane keeping aid system. The predetermined number may in this case be set to e.g. allow up to six torque interventions by the lane keeping aid system without an indication that the driver is attending to the task of steering before disabling the lane keeping aid system. The number of subsequent torque interventions allowed without the driver having his/her hands-on the steering wheel may be registered by a counter and the number allowed before disabling the lane keeping aid system may be tuned through changing a disable threshold value corresponding thereto.

It is clear that the means for determining 107 could be arranged to perform the determination in several ways depending on the desired machine-human-interaction of the hands-on/off detection.

The arrangement still further comprises means A1, A2, A3 for performing the action determined by the determining means 107. The means A1, A2, A3 for performing the action determined by the determining means 107 comprises suitable actuators A1, A2, A3, for providing outputs OUT1, OUT2, OUT3, for performing the actions, e.g. allow further torque interventions by the lane keeping aid system, provide a hands-off warning to the driver of the vehicle, disable the lane keeping aid system or re-enable the lane keeping aid system.

Further embodiments herein relate to a method for safeguarding driver attentiveness to the task of steering while operating a vehicle having a lane keeping aid system, where lane keeping aid system is arranged to selectively apply an overlaying steering torque to the steering system in order to prevent unintentional lane changes. The steering system of the vehicle comprises a steering wheel, a pinion and a torsion bar.

The method proposed herein starts at 100 followed by a step of determining if there is an ongoing torque intervention 101 by the lane keeping aid system. The method thereafter comprises the further steps of: measuring pinion angle and torsion bar torque 102 when the lane keeping aid system is applying an overlaying steering torque; estimating driver applied torque 103 from the measured pinion angle and torsion bar torque; calculating a hands-off metric 104 based on a relation between the measured torsion bar torque and the estimated driver applied torque; determining hands-off 105 based on a comparison of the calculated hands-off metric with a predefined threshold; evaluating hands-on 106 between torque interventions by the lane keeping aid system; determining an action 107 based on the determined hands-off and the evaluated hands-on; and finally performing the action A1, A2, A3 determined.

In one embodiment the method further comprises the step of recalculating the hands-off metric after a predefined time period.

In a further embodiment the method further comprises the step of terminating the predefined time period once the step of determining hands-off 105 has been performed.

In a yet further embodiment the step of determining an action 107 comprises a determination whether to allow further torque interventions by the lane keeping aid system or to provide a hands-off warning to the driver of the vehicle or to disable or re-enable the lane keeping aid system based on predefined conditions.

In a still further embodiment the step of determining an action 107 comprises a determination using state management S1, S2, S3 based on the predefined conditions whether to allow further torque interventions by the lane keeping aid system or to provide a hands-off warning to the driver of the vehicle or to disable or re-enable the lane keeping aid system.

As the task of detecting hands-off is only carried out during periods of ongoing torque interventions by the lane keeping aid system detection becomes more reliable/precise due to the guaranteed levels of excitation of the steering system during the ongoing torque interventions. It is well known that any detection algorithm requires sufficient excitation.

Through performing detection of hands-off only in relation to an ongoing torque intervention by the lane keeping aid system generates a logic link to the system causing the need for the detection. Thus, from a vehicle driver perspective, it will be easy to understand the information about hands-off and the information provided to the driver of the vehicle may be kept at a minimum.

Furthermore, the risk for false and thus annoying hands-off warnings is practically eliminated as compared to prior-art systems with an evaluation at all times. The herein described approach for hands-on/off detection makes it possible to use a sensitive hands-off detection implying few or no missed detections without risk for false warnings. Moreover, in combination with the hands-off detection, it is possible with a very conservative hands-on evaluation rendering unattended steering virtually impossible.

In accordance with the present application is also envisaged a vehicle comprising an arrangement as described above. Further in accordance with the embodiments described herein, the means for performing the various functions described may comprise or further comprise computer software, hardware or both, such as an Application Specific Integrated Circuit (ASIC), one or more appropriately programmed microprocessors, or one or more controllers or control modules.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or operations which perform substantially the same function in substantially the same way to achieve the same results are equivalent. Moreover, it should be recognized that structures and/or elements and/or operations shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms. Rather, the words used in the specification are words of description rather than limitation, and it is understood that various changes may be made without departing from the spirit and scope of the following claims. Additionally, the features of various implementing embodiments described may be combined to form further embodiments.

What is claimed is:

1. A system for safeguarding driver attentiveness to the task of steering while operating a vehicle having a lane keeping aid system for selectively applying an overlaying steering torque to the steering system, the steering system comprising a steering wheel, a pinion and a torsion bar, the system comprising:
   means for measuring pinion angle and torsion bar torque when the lane keeping aid system is applying an overlaying steering torque;
   means for estimating driver applied torque from the measured pinion angle and torsion bar torque;
   means for calculating a hands-off metric based on a relation between the measured torsion bar torque and the estimated driver applied torque;
   means for determining hands-off based on a comparison of the calculated hands-off metric with a predefined threshold;
   means for evaluating hands-on between torque interventions by the lane keeping aid system;
   means for determining an action based on the determined hands-off and the evaluated hands-on; and
   means for performing the action determined.

2. The system according to claim 1, wherein the means for calculating a hands-off metric further are arranged to recalculate the hands-off metric after a predefined time period.

3. The system according to claim 2, further comprising means for terminating the predefined time period once the means for determining hands-off has performed the determination.

4. The system according claim 1, wherein the means for determining an action are configured to determine whether to allow further torque interventions by the lane keeping aid system, whether to provide a hands-off warning to the driver of the vehicle, and whether to disable or re-enable the lane keeping aid system based on predefined conditions.

5. The system according to claim 4, wherein the means for determining an action comprises a state machine configured to determine based on said predefined conditions whether to allow further torque interventions by the lane keeping aid system, whether to provide a hands-off warning to the driver of the vehicle, and whether to disable or re-enable the lane keeping aid system.

6. A method for safeguarding driver attentiveness to the task of steering while operating a vehicle having a lane keeping aid system for selectively applying an overlaying steering torque to the steering system, the steering system comprising a steering wheel, a pinion and a torsion bar, the method comprising:
   measuring pinion angle and torsion bar torque when the lane keeping aid system is applying an overlaying steering torque;
   estimating driver applied torque from the measured pinion angle and torsion bar torque;
   calculating a hands-off metric based on a relation between the measured torsion bar torque and the estimated driver applied torque;
   determining hands-off based on a comparison of the calculated hands-off metric with a predefined threshold;
   evaluating hands-on between torque interventions by the lane keeping aid system;
   determining an action based on the determined hands-off and the evaluated hands-on; and
   performing the action determined.

7. The method according to claim 6, further comprising recalculating the hands-off metric after a predefined time period.

8. The method according to claim 7, further comprising terminating the predefined time period once the step of determining hands-off has been performed.

9. The method according to claim 6, wherein determining an action comprises a determination whether to allow further torque interventions by the lane keeping aid system, whether to provide a hands-off warning to the driver of the vehicle, and whether to disable or re-enable the lane keeping aid system based on predefined conditions.

10. The method according to claim 9, wherein determining an action comprises determining using state management based on said predefined conditions whether to allow further torque interventions by the lane keeping aid system, whether to provide a hands-off warning to the driver of the vehicle, and whether to disable or re-enable the lane keeping aid system.

11. A system for safeguarding driver attentiveness to the task of steering while operating a vehicle having a lane keeping aid system for selectively applying an overlaying steering torque to the steering system, the steering system comprising a steering wheel, a pinion and a torsion bar, the system comprising:
- a controller configured to
  - receive measurements of pinion angle and torsion bar torque when the lane keeping aid system is applying an overlaying steering torque,
  - estimate driver applied torque from the measured pinion angle and torsion bar torque,
  - calculate a hands-off metric based on a relation between the measured torsion bar torque and the estimated driver applied torque,
  - determine hands-off based on a comparison of the calculated hands-off metric with a predefined threshold,
  - evaluate hands-on between torque interventions by the lane keeping aid system, and
  - determine an action based on the determined hands-off and the evaluated hands-on; and
- an actuator for use in performing the action determined.

12. The system according to claim 11, wherein the controller configured to calculate a hands-off metric is further configured to recalculate the hands-off metric after a predefined time period.

13. The system according to claim 12, wherein the controller is also configured to terminate the predefined time period once the hands-off determination has been performed.

14. The system according claim 11, wherein the controller configured to determine an action is further configured to determine whether to allow further torque interventions by the lane keeping aid system, whether to provide a hands-off warning to the driver of the vehicle, and whether to disable or re-enable the lane keeping aid system based on predefined conditions.

15. The system according to claim 11, wherein the controller configured to determine an action comprises a state machine configured to determine based on said predefined conditions whether to allow further torque interventions by the lane keeping aid system, whether to provide a hands-off warning to the driver of the vehicle, and whether to disable or re-enable the lane keeping aid system.

16. The system according to claim 11 wherein the controller is further configured to receive input from at least one sensor.

17. The system according to claim 16 wherein the at least one sensor comprises at least one of a pinion angle sensor and a torsion bar torque sensor.

18. The system according to claim 11 further comprising at least one sensor.

19. The system according to claim 18 wherein the at least one sensor comprises at least one of a pinion angle sensor and a torsion bar torque sensor.

20. The system according to claim 11 wherein the actuator is configured to provide an output for use in performing the action determined.

* * * * *